Patented Oct. 8, 1935

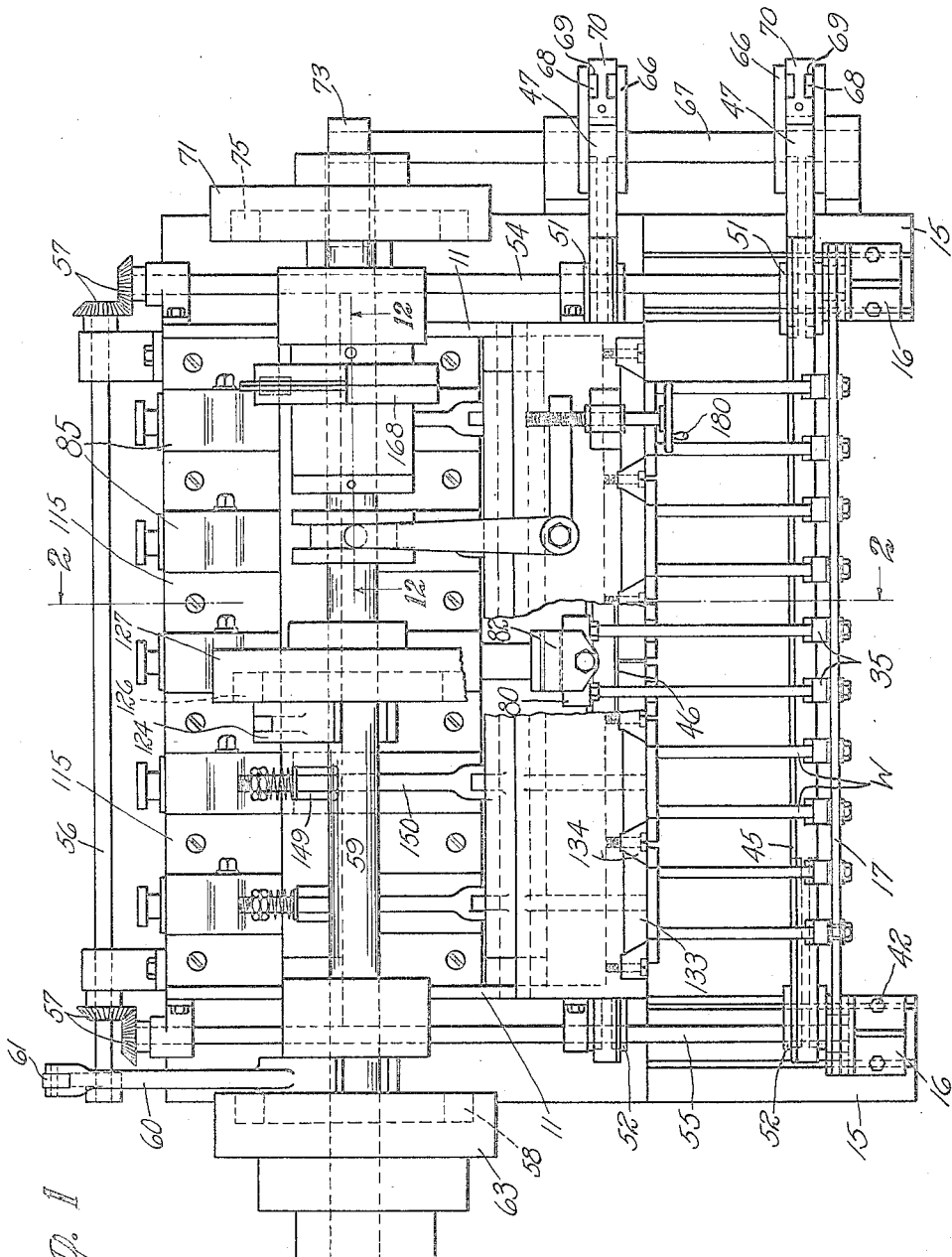

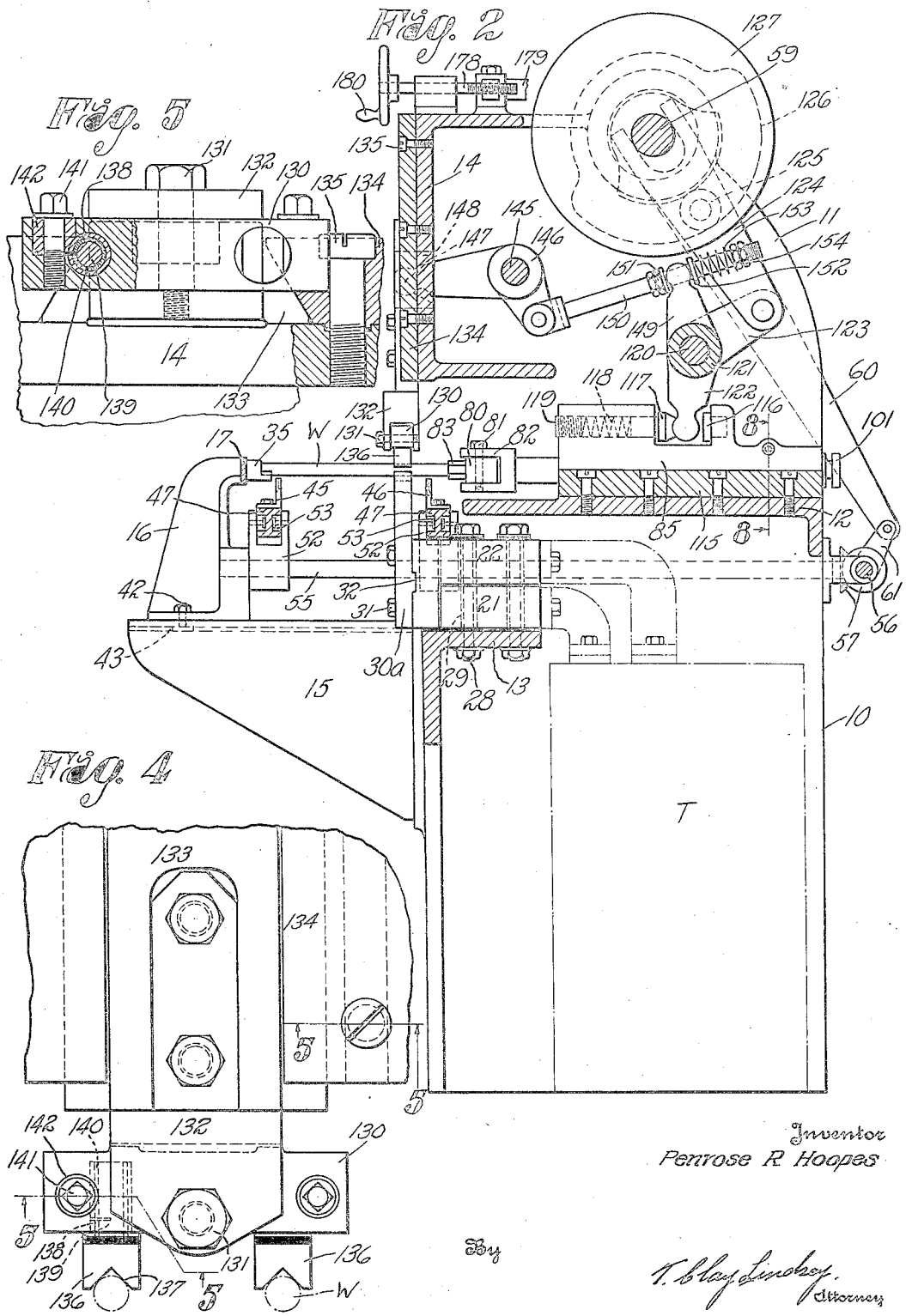

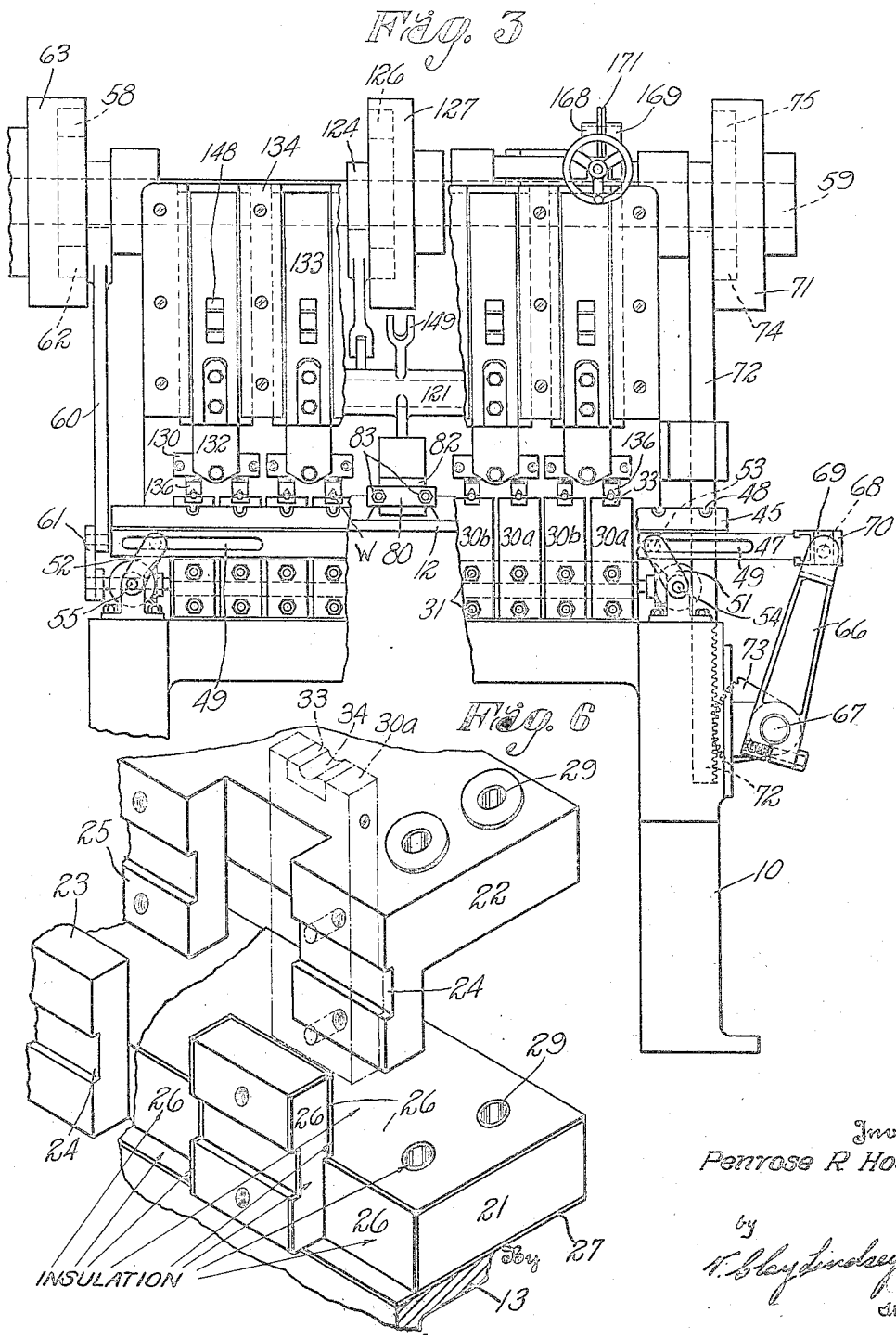

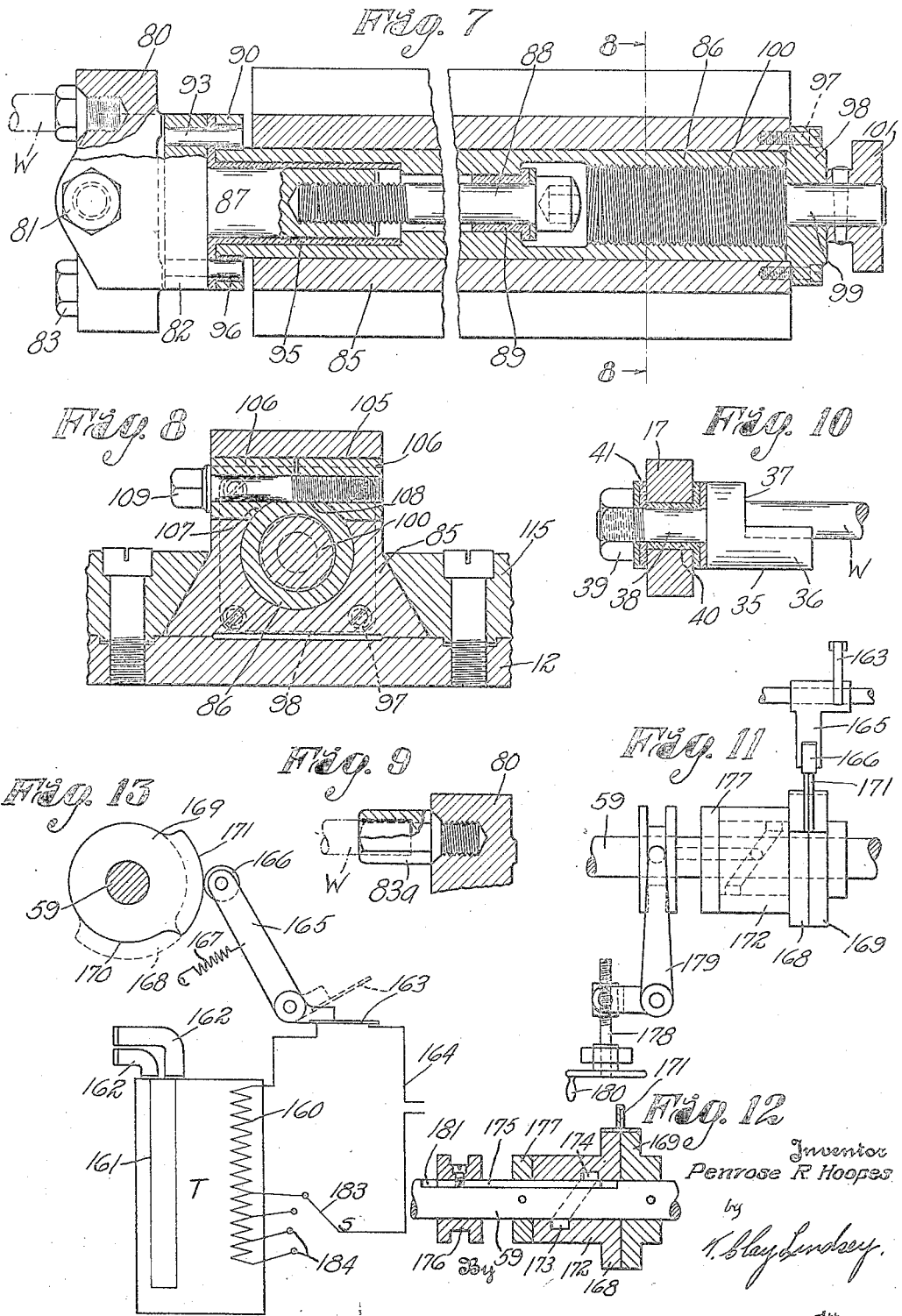

2,016,369

UNITED STATES PATENT OFFICE 2,016,369

MACHINE FOR ELECTRICALLY HEATING METAL ARTICLES

Penrose R. Hoopes, Hartford, Conn., assignor to The Ajax Manufacturing Company, Euclid, Ohio, a corporation of Ohio Application May 6, 1931, Serial No. 535,334

32 Claims. (Cl. 219—11)

This invention relates generally to the art of heating articles by passing an electric current therethrough, and has particular reference to an improved machine for and method of electrically heating metal articles or objects preliminary to performing subsequent operations in order to change the shape thereof, the articles being heated in a series of stages by intermittently and successively passing an electric current therethrough. As an instance of a use to which the improvements of the present invention may be applied, reference may be had to a machine for heating the ends of rods or bars preliminary to heading or forging such ends, but obviously the improvements of the present invention are susceptible of various embodiments and may be adapted for use in electrically heating a large variety of objects of various sizes and shapes preparatory to performing other operations thereon, such as rolling, bending, upsetting, et cetera. My improved machine may be used in combination with, or as an adjunct to, other apparatus, such as forging or bending machines, which it is not deemed necessary to show or describe here.

An aim of the present invention is to provide a machine of the character described having various features of novelty and advantage and which is particularly characterized by its effectiveness and efficiency in use and operation in that the articles may be economically heated through the desired length or extent and to the required temperature in a uniform and rapid manner, with a minimum consumption of electric current and without unduly heating or affecting the parts of the machine.

A further aim of the invention is to provide an improved machine which may be very easily and nicely adjusted to accommodate articles of various sizes and kinds and wherein the current passing through the articles to be heated may be easily and accurately controlled.

A still further aim of the invention is to provide a machine having the above and other objects and which is characterized by its simplicity and compactness in construction and arrangement, by its economy in manufacture, by its strength and durability, and by its ability to stand up under operating conditions without readily getting out of order.

Other objects will be in part obvious, and in part pointed out in detail hereinafter.

The invention accordingly consists in the features of construction, combination of elements and arrangement of parts which will be exemplified in the construction hereinafter set forth and the scope of the application of which will be indicated in the appended claims.

In order that the following detailed description may be more easily followed, it may be well to state here that, in the present illustrated form of the invention, the machine has a plurality of stationary electrodes, generally one behind the other, and a like number of rests spaced laterally from and respectively aligned with the electrodes. The pieces or articles to be heated (here termed for convenience only as "work pieces") are supported in parallel and side by side arrangement by the electrodes and rests with those ends of the work piece not to be heated setting on the rests while the portions to be heated overhang to the opposite sides of the electrodes. There is a transfer mechanism comprising a pair of notched bars movable in a rectangular path so as to progress the work pieces through the machine in a series of stages. In the present illustrated disclosure, there are ten electrodes or stations and the transfer mechanism moves the work pieces on each step through twice the distance between the stations so that each piece of work has five heating positions, and in each of which positions current is passed through that portion of the work to be heated, whereby that portion is raised to the desired temperature in a series of five stages. The electrodes are associated in a succession of pairs by bridging members each adapted to be brought against the ends of the overhanging portions of two work pieces respectively supported by adjacent electrodes. The machine also has a plurality of clamping members operated in timed relation to the bridging members and in a plane at right angles thereto, and these clamping members are adapted to yieldingly force the work pieces against the electrodes so as to insure good electrical contact therebetween. Each time the work pieces are brought to a new position and after the bridging members have been brought into engagement with the work pieces, current is thrown onto the electrodes, whereupon the current will flow from one electrode to the overhanging portion of one piece of work through a bridging member to the overhanging portion of the other piece of work to the adjacent electrode, which is to say, that the work pieces are heated in pairs. The current is on for a short period of time to impart the desired increment of heat to the pieces of work and then the circuit is broken, the clamps and bridging members are withdrawn, and the work pieces are advanced another step. The arrangement is such that the applications of electric current to the work pieces may be controlled with great nicety both as to the length of time the current is on and the strength of the current. Among other well known advantages of heating a work piece, and particularly that porttion to be operated upon, to the desired temperature in a series of stages, may be mentioned the following: the nicety with which the heating effects can be carried out; the uniformity with which the pieces are heated; the prevention of burning the work pieces and damaging the electrodes, and the speed and expedition with which the work pieces are successively brought up to the desired temperature.

In the accompanying drawings, wherein is shown one embodiment which the present invention may take, Fig. 1 is a top plan view of my improved apparatus;

Fig. 2 is a transverse section therethrough, this view being taken substantially on line 2—2 of Fig. 1;

Fig. 3 is a side view of the machine, with parts broken away;

Fig. 4 is an enlarged detail view showing a clamping arrangement for holding a pair of articles to be heated against respective electrodes;

Fig. 5 is a bottom view of what is shown in Fig. 4, with parts broken away on lines 5—5 of that figure;

Fig. 6 is a perspective view of portions of the two bus bars to which the electrodes are adapted to be secured;

Fig. 7 is a sectional view taken on a horizontal central plane through one of the slide assemblies which carry the bridging members;

Fig. 8 is a transverse sectional view through the slide assembly and the gibs therefor, this view being taken substantially on lines 8—8 of Figs. 2 and 7;

Fig. 9 is a detail view showing a modified form of contact or plug with which the bridge members or conductors may be provided;

Fig. 10 is a detail view showing the manner in which one of the end supports or rests for the articles to be heated is secured in place;

Fig. 11 is a detail view showing, more or less diagrammatically, an arrangement for operating a switch which controls the current;

Fig. 12 is a sectional view of that arrangement, this view being taken on line 12—12 of Fig. 1; and Fig. 13 is a diagrammatic view of the controlling switch and the transformer with which it is associated.

Referring to the drawings in detail, it is obvious that the frame of the machine may be of any suitable construction, but it is here shown as having a pair of end walls or legs 10 from which arise end standards 11, the end walls being connected by a horizontal table or bed plate 12 upon which is mounted the slides which carry the bridging members. The frame also has a shelf 13 on which are mounted the bus bars, to be hereinafter described more in detail. Extending between the standards 11 is a vertical web 14 which supports the slides which carry the clamping members. Extending laterally from the end walls of the frame are suitable knees 15 on which are adjustably mounted brackets 16 connected by a rail 17 which carries the end supports or rests for the work pieces.

Heretofore it has been the practice in this art to make provision for moving at least some of the electrodes so that they might be brought into and out of engagement with the work, and such practice required flexible leads composed of a plurality of laminations or strips of copper superimposed upon one another and connected together. This old practice is open to numerous objections, and particularly the expense involved in providing such leads and maintaining the same in repair. In the preferred form of the present invention, these objections are eliminated by making all the electrodes stationary, the electrodes preferably being directly and rigidly connected to bus bars which in turn are directly connected to the terminals of the secondary winding of the transformer T. It will be observed from the following description that this arrangement is not only a more economical one both in installation and maintenance, but it is also very compact and efficient.

Referring to Figs. 2 and 6 of the drawings, the bus bars, designated generally by the numerals 21 and 22, are generally similar in construction and are complemental to one another. The lower bus bar 21, which for convenience may be termed the plus bus bar, rests upon the shelf 13 and it has at one side spaced apart and upstanding lugs 23 provided with longitudinally extending grooves 24. The upper or minus bus bar 22 rests upon the lower one 21 and has a plurality of depending lugs 25 complemental to and adapted to fit between the lugs 23. The two bus bars are insulated from one another by sheets of insulation 26 so that there is no direct electrical connection therebetween, and the lower bus bar is insulated from the shelf 13 by a sheet of insulating material 27. The bus bars are secured in assembled position on the shelf 13 in any suitable manner, as by means of bolts 28, which pass through insulated bushings 29. Those electrodes connected to the minus bus bar 22 are designated by the numeral 30a, and the electrodes connected to the plus bar 21 are designated by the numeral 30b. Each of these electrodes comprises a heavy strip or block of copper or the like secured in upright position to a respective lug of a bus bar, as by means of screws or bolts 31. Each electrode may have a rib 32 (see Fig. 2) closely engaging in a groove 24 in order to hold the electrode steadily and rigidly. Each electrode has, at its upper end, a rectangular notch in which is removably fitted a contact block 33 having a recess 34 in which the work pieces rest. The shape of this notch, of course, will vary in accordance with the character of the work to be treated, the recess in the present instance being parti-cylindrical under the assumption that round rod blanks W are to be heated. These removable contact blocks are provided in order that when they become burned they may be replaced with new ones at little expense. The electrodes 30a and 30b alternate with one another. The work pieces are supported by these electrodes with those portions to be heated extending laterally therebeyond. The opposite ends of the work pieces are supported by rests 35 which are carried by the rail 17 in transversely aligned relation to the respective electrodes. Each of these rests, as will be seen most clearly in Fig. 10, has a cradle portion 36 with a groove in its upper surface for receiving the end of the work piece. The rests also have vertical walls or stops 37 opposed to the hereinafter described bridging members. These rests 35 may be secured in any suitable manner to the rail 17, as by means of threaded studs 38 and nuts 39. The rests are insulated from the rail by sleeves 40 and washers 41. The brackets 16 are adjustably mounted on the knees 15 in order that the distance between the rests and the bridging members may be adjusted in accordance with the length of the articles to be heated. For example, the brackets may be secured in adjusted position by bolts 42, the heads of which engage in T-slots 43 in the top surfaces of the knees 15.

For the purpose of transferring the work pieces from one position to another, the following transfer arrangement is provided: the numerals 45 and 46 designate a pair of change bars in the form of angle irons secured to rails 47, one of the change bars being located just inwardly of the rests 35 and the other one between the electrodes and the bridging members. The upstanding flanges of these bars are provided with aligned notches 48 which are spaced apart correspondingly to the spacing of the rest. The edges of these notches are somewhat reduced in thickness, as shown most clearly in Fig. 2, in order to give as little contact between the work pieces and these bars as possible and thus minimize the transfer of heat therebetween.

Each of the rails 47, adjacent each end and on opposite sides, is provided with a longitudinally extending groove 49. Each rail is supported by a pair of swinging arms 51 and 52, the upper ends of which are bifurcated and provided with rollers 53 engaging in the grooves or slots 49. The pair of forward arms 51 are fixed in alignment to a transverse shaft 54 while the rear arms 52 are correspondingly fixed to a similar shaft 55, these two shafts being connected together by a countershaft 56 and bevel gears 57 so that, when the shaft 54 and the arm 51 thereon are rocked in one direction, the other shaft 55 and the arms 52 thereon are rocked in the opposite direction through a like arc. The countershaft 56 is rocked in timed relation to the other mechanisms by means of a cam 58 carried by the main drive shaft 59. This cam operates through a yoke 60 and an arm 61, the latter being secured to the countershaft 56. The upper end of the yoke is adapted to straddle the shaft 59 and it has a roller 62 engaging in the cam groove 58 which is provided in the pulley 63. This cam groove is somewhat similar to the hereinafter described cam groove for operating the slides which carry the clamping and bridging members. It is here sufficient to say that the groove 58 has a portion for turning the countershaft 56 in one direction so as to raise the transfer bars; a dwell portion for holding the bars raised while they are being moved on their operative stroke, a portion for turning the shaft 56 in the opposite direction to lower the transfer bars after the transfer of the work pieces has been completed, and a dwell portion for holding the bars in lowered position while the transfer bars are being moved forward to original position. The transfer bars are moved longitudinally through pivoted arms 66, fixed to a transverse shaft 67 and having their upper ends bifurcated. These bifurcated ends carry rollers 68 which engage in vertical grooves 69 provided in extensions 70 secured to the forward ends of the rails 47. The shaft 67, together with the arms 66, are rocked in timed relation to the arms 51 and 52 by means of a cam 71 fixed to the drive shaft 59 and acting through a reciprocating rack 72 meshing with a segment 73 fixed to the shaft 67. The upper end of the rack 70 is forked so as to straddle the shaft 59 and it carries a roller 74 operating in a cam grove 75 in the cam 71. This groove 75 is so constructed as to move the transfer bars rearwardly (i. e. to the left, referring to Fig. 3) when the bars have been raised by the arms 51 and 52, and forwardly to the initial position shown in Fig. 3 after the transfer bars have been lowered.

The bridging members 80 and the manner in which they are carried and operated will now be described. These bridging members are arranged so as to connect the work pieces in pairs, whereby the current will pass from one electrode 30a to the adjacent electrode 30b through the bridging member and the portions of the two work pieces between the electrodes and bridging member. The number of bridging members will depend upon the number of electrodes with which the machine is provided. In the present instance, there are ten electrodes and therefore, five bridging members. These bridging members are adapted to be moved in a horizontal plane towards and away from the opposed rests 35 and they are so carried that they may readily accommodate themselves to variations and inequalities in the pieces of work, thus assuring proper contact between each bridging member and the two pieces of work which it is adapted to electrically bridge.

Referring to the drawings in detail, and particularly to Figs. 1, 7, and 8, each bridging member 80 comprises a block of good conducting material, such as copper, pivoted between its ends, as at 81, in the yoked end of a holder or head 82. Each block 80 has a pair of contact members 83 adapted to engage and press against the ends of the respective work pieces. These contact members, in Fig. 7, are shown as being in the form of screw plugs. In Fig. 9, the screw plug 83a is shown as having a recess in its outer end into which the work piece is adapted to extend. This arrangement is provided where it is desired to heat the work piece at a point spaced from its extreme end to a higher temperature than its extreme end. This may be desirable where the portion of the work piece which has been heated is to be bulged out at a point spaced from its remote end. Each holder 82 is carried by a respective slide 85. The holders are adjustable relative to their slides in order to allow relatively large tolerance in manufacture with resultant economies, and also to permit of adjustment of the bridging members with respect to the electrodes in accordance with the extent or lengths of the portions of the work pieces to be heated.

The slide assemblies for the bridging pieces are similar in construction. Each slide has a through bore in which is mounted for sliding movement a sleeve 86 into the forward end of which extends the stem 87 of the holder 82. This stem is secured in place in the sleeve by a screw 88 the head of which engages against an insulating bushing 89 lodged in the sleeve 86 between its ends. In order to prevent rotation of the holder, the latter is dowelled to the head of the sleeve 86 by pins 93. The holder is insulated from the sleeve 86 by a flanged tube 95 of insulating material; the dowel pins are insulated from the sleeve by bushings 96, and the bushing 89 is of insulating material so that there is no electrical connection between the bridging member 80 and the sleeve 86 or the slide carrying the sleeve. In order to adjust the sleeve 86 longitudinally with respect to the slide 85, there is secured to the slide, as by means of screws 97, a plate 98 in which is journalled a stem 99 having a threaded portion or plug 100 screwed into the rear threaded end of the sleeve 86. The outer end of the stem 99 has fixed to it a knob 101 engaging against the plate 98. When the screw 100 is turned by means of the knob 101, the sleeve will move longitudinally, it being observed that the screw 100 has no longitudinal movement owing to the plate 98.

For the purposes of preventing rotation of the sleeve 86 and securely clamping the sleeve in adjusted position, the arrangement shown in Fig. 8 is provided. As shown in that figure, the slide 65 has a transverse opening 105 which cuts into the bore in which the sleeve is located and, positioned in this transverse opening and to opposite sides of the sleeve, is a pair of jaw members 106 having surfaces 107 concentric to and adapted to engage against the periphery of the sleeve. The sleeve, where it passes through this transverse opening, has a flat surface 108. A screw 109 extends through one of the jaw members 106 and is threaded into the other one so that, when the screw is tightened up, the jaw members are brought towards and securely clamped against the sleeve, the bolt being in such position that it engages the flat surface 108 of the sleeve.

The slides 85 are located side by side upon the table plate 12 of the frame and are held thereagainst for sliding movement by gibs 115. These slides may be moved in unison in any desired manner towards and away from the rests 35 but, by way of example, there is shown, in the present instance, a driving connection between the main drive shaft 59 and the slides. Each of the slides is provided on its top with a pair of opposed abutments or shoulders 116 and 117, the latter of which is spring pressed. In the present instance, there is a spring 118 behind the plunger 117 and an adjustable screw 119 behind the spring. Extending between the standards 11 of the frame and located below the main shaft is a rod 120 on which is journalled a long tube or sleeve 121 having a plurality of depending arms 122, one for each slide. There being five slides in the present instance, there are five such arms and the lower ends of these arms respectively engage between the abutments 116 and 117. Extending from the sleeve or tube 121 is an arm 123 connected to a yoke 124 the upper end of which straddles the drive shaft 59. This yoke has a roller 125 engaging in a cam groove 126 of a cam 127 fixed to the shaft 59 between its ends. This cam groove 126 will, of course, be so related to the cam groove 58 for raising and lowering the transfer members and the cam groove 75 for moving those members longitudinally, that the slides will be operated in the proper sequence to the remaining instrumentalities. It is sufficient to say that, after the current is thrown off subsequent to each heating operation, the cam 127 will withdraw the bridging members from the work pieces whereupon the transfer mechanism comes into play to move the pieces of work to successive stations, and the cam will advance the bridging members into engagement with the work pieces immediately after the same have been brought to their new positions and before the current is again thrown on.

The machine is provided with a plurality of clamps for holding the work pieces securely against the electrodes so as to insure good electrical conduction therebetween. In the present instance, these clamping members are arranged to move in the vertical plane in which the electrodes are located and are adapted to clamp the work pieces in pairs. The clamping instrumentalities are of similar construction and, therefore, a description of one will apply to the others. Referring particularly to Figs. 3, 4, and 5, each clamping instrumentality includes a block 130 pivoted between its ends, as at 131, in the lower yoked end of a holder 132 secured to a slide 133. These slides are guided by gibs 134 fixed by screws 135 to the vertical web 14 of the frame. The block 130 carries, but is insulated from, a pair of jaw pieces 136, the shape of the work engaging surfaces of which will depend upon the character of the work pieces to be heated. In the present instance, these jaw pieces 136 are provided with V-grooves 137 in their lower ends. The grooves of each pair of jaw pieces are spaced apart correspondingly to the notches 34 of adjacent electrodes, as shown most clearly in Fig. 3. The jaw pieces 136 may be connected to the block 130 in any suitable manner, but, by way of example, the block 130 is shown as having openings in which are located split metal bushings 138 into which extend the stems 139 of the jaw pieces. Interposed between the stem 139 and the bushing 138 is a split insulating bushing 140. The split bushing 130 is tightly contracted about the stem of the jaw piece and is tightly crowded against the wall of the opening in which it is located by a screw 141 acting through a collar 142. When the screw is tightened up, this collar is forced against the sleeve 138, as will be seen most clearly from Fig. 5.

The slides 133 are moved towards and away from the work pieces in timed relation with the movements of the slides 65. To this end, the slides 133 are operated by the cam 127 acting through the sleeve or tube 121. Supported at its ends by the standards 11 is a rod 145 on which is journaled a plurality of cranks 146, one for each slide. Each crank has an arm provided with a head 147 which engages in a socket 148 in a respective slide 133. The sleeve or tube 121 has a plurality of yoked arms 149 corresponding in number to the number of slides, namely five, and these arms are respectively connected to the cranks 146 by rods 150. Resilient and preferably adjustable connections are provided between the arms 149 and the rods 150 in order to permit of adjustment of the clamps relative to the electrodes and to allow the clamps to be held under the desired pressure against the work pieces. To this end, each rod carries an adjustable member 151 in the form of a nut against which an arm 149 engages during the operation of raising the slides. To the opposite side of the arm 149 is a collar 152 behind which is a spring 153 the compression of which may be adjusted by means of nuts 154.

The electric current is supplied to all of the electrodes 30a and 30b through a single transformer T which has a primary coil 160 and a secondary coil 161. This transformer is shown more or less conveniently or schematically in Fig. 13. The terminals 162 of the secondary coil are directly and rigidly connected to the respective bus bars 21 and 22, as shown most clearly in Fig. 2. Means are provided for automatically throwing the current onto the transformer after the work pieces have been brought to position at the several stations and the bridging members are engaged with the work pieces. The current is broken prior to withdrawing the bridge pieces and clamping members from the work pieces. This controlling means includes a switch having a blade 163 interposed in the current supply line 164. The blade is carried by a pivoted lever 165 having a roller 166 urged by a spring 167 against an adjustable cam carried by the main drive shaft 59. This adjustable cam, shown most clearly in Figs. 11, 12, and 13, has two parts 168 and 169, the latter of which is fixed to the shaft 59. Each of these cam parts has two concentric portions 170 and 171, the latter being of lesser angular extent than, and of greater radius than, the former. The cam part 168 is adjustable so as to regulate the extent to which the concentric portions 171 overlap. In order that the cam part 168 may be adjusted while the machine is operating, it has a sleeve portion 172 with an internal spiral groove 173 in which engages a projection 174 on a draw bar 175 secured at one end to a grooved sleeve 176. This sleeve is slidable on the shaft 59 and is fixed to the draw bar. The draw bar 175 is mounted for longitudinal sliding movement in a keyway 181 in the shaft 59. The grooved sleeve 176 is adapted to be moved longitudinally on the shaft 59 by a screw 178 acting through a crank lever 179. This screw has a conveniently positioned handle 180 for turning the same. It will be evident that when the screw 178 is turned, the draw bar will be moved longitudinally and owing to the engagement of the projection 174 in the spiral groove 173, the cam part 168 will be rotatably adjusted with respect to the cam part 169. The cam part 168 has no longitudinal movement, as it is positioned between a fixed collar 177 and the fixed cam part 169. If it is desired to have the current on the minimum length of time during each heating stage, the cam part 168 will be adjusted so that the concentric portions 171 will register. A maximum heating period is had by adjusting the cam part 168 so that the two concentric portions 171 are substantially end to end, as shown in Fig. 13. Any predetermined length of heating period may be obtained between the maximum and the minimum by overlapping the two concentric portions 171 of the cam parts. The strength of the heating current may be controlled by the switch S, shown in Fig. 13, as being associated with the primary winding of the transformer. This switch has an arm 183 adapted to selectively engage contacts 184 which are connected to the primary coil at different points. If maximum amperage is desired, the switch arm 183 is engaged with the lowermost contact 184 so as to connect the whole of the primary 160 into circuit. If a lesser electric current strength is wanted, the effective length of the primary is reduced by engaging the switch arm 183 with a selected one of the other contacts.

The operation of my improved machine will be readily understood from the foregoing description taken in connection with the accompanying drawings and the following statement. In the present illustrative disclosure, the machine is shown as having ten stations at each of which is a pair of supports, one of the supports of each pair comprising an electrode and the other an end rest 35. It may be assumed that the machine is set up so that the transfer bars have a stroke which is equal to the distance between alternate stations, in which event the pieces of work are successively brought to five different positions as they travel through the machine. In this event, the pieces of work are fed in pairs by suitable feeding mechanism (not shown) to the first two sets of notches at the right hand end of the transfer bars, and one of these pieces of work is successively brought into engagement with the electrodes 30a while the other one is successively brought into engagement with the electrodes 30b. In such instance, each piece of work will be heated in five stages. Obviously, however, the machine may have any desired number of stations, and each piece of work may be brought successively to all of the stations, or such movement may be given to the transfer mechanism as to cause each piece of work to skip more than one station. The pieces of work may be fed to the transfer mechanism automatically or manually, as desired, and any suitable mechanism may be positioned at the discharge end of the machine for taking the pieces of the heated work from the machine and transferring them to the other instrumentalities or mechanisms, such, for example, as a forging or bending machine.

During the operation of the machine, the main drive shaft is continuously driven, as by means of a belt (not shown) passing about the stepped pulley 63. By changing the position of the belt with respect to this pulley, the speed of operation of the machine may be controlled and, incidentally, the time periods during which the work is being heated may be controlled. Starting with the parts in the positions illustrated in the main figures, a heating current flows from each electrode 30a to the next electrode 30b through the overhanging portions of the pieces of work resting on those electrodes and the bridging member which is in engagement with the ends of those portions. The current is on for a relatively short period of time so that an increment of heat is applied to the work pieces. The current is broken by automatically opening the switch 163 (Fig. 13) which occurs when the cam portions 171 move out of engagement with the roller 166. Then the cam 127 raises the clamping members and withdraws the bridging members from engagement with the work pieces, whereupon the cam groove 58 will cause the transfer bars to rise, picking up the work pieces from the electrodes. The cam 71 will move the transfer bars longitudinally so as to advance each of the pieces of work two stations and bring two new pieces of work above the first and second electrodes. The cam 58 will now cause the transfer bars to drop so that the work pieces are brought to new positions on the electrodes and rests 35, whereupon the cam 71 will return the transfer bars to the position shown in Fig. 3 and where the first two pairs of notches of the transfer bars are in a position to receive two new pieces of work preliminary to the next feeding operation. The cam 127 now advances the bridging members against the work pieces, and lowers the clamping instrumentalities, whereupon the switch 163 is closed so that the current will again pass through the work pieces in the manner previously described. In the event that it is desired to change the period of time that the current is on, this may be readily done without stopping or interfering with the operation of the machine by adjusting the switch cam part 168 through the instrumentality of the screw 178.

From the foregoing description, it will be observed that those portions of the work pieces to be operated upon are heated in a series of stages, in the present instance five, so that they are gradually brought up to the desired working temperature. The arrangement is such that the work pieces may be moved from one station to another and the clamping members and bridging members brought into and out of engagement with the work pieces with a minimum loss of time so that the efficiency of the machine is relatively high and the work pieces may be economically heated. The transfer bars are out of engagement with the work pieces during the operations of heating the latter so that transfer of heat to these bars is minimized and there is practically no energy losses caused by setting up electrical manifestations in the transfer mechanism. Certain parts and mechanisms of the machine may be adjusted to accommodate the particular job to be done. The electrical current which passes through the portions of the work pieces to be heated may be very nicely controlled both as to the duration of time that the current is on and the amount of current passing through the work pieces. The time element may be controlled by either adjusting the switch controlling cam 168 or changing the speed of operation of the machine; or both of these expedients may be employed. The strength of the current may be nicely adjusted by the switch S with which the primary of the transformer T is provided. The machine is relatively simple and compact in construction and effective in operation. As previously pointed out, all of the electrodes are fixed, which greatly simplifies the machine and reduces its cost of manufacture, the use of heavy flexible laminated conductors which are likely to break and wear out being avoided. A single transformer is employed which results in further economy in manufacture, installation and maintenance.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed is:

1. In a machine of the character described, a plurality of stations each having stationary means for supporting work pieces during the heating operation, transfer means for advancing the work pieces in a series of steps to the successive stations and depositing the work pieces on said supporting means, and means for passing a heating current through the work pieces after each transfer thereof.

2. In a machine of the character described, a plurality of stations one behind the other and each having stationary means for supporting the work pieces to be heated, transfer means for progressing the work pieces in a series of steps to the successive stations, said transfer means being adapted to deposit the work pieces on said stationary members and then move out of contact with said work pieces, and means for passing a heating current through the work pieces at the several stations.

3. In a machine of the character described, a plurality of stations arranged in a horizontal plane and positioned one behind the other, each station having stationary means for supporting the work pieces, transfer mechanism for progressing the work pieces to successive stations, said transfer mechanism being movable in a rectangular path, and means for passing a heating current through the work pieces at the several stations.

4. In a machine of the character described, a plurality of stations associated in pairs, each pair of stations having a positive electrode and a negative electrode adapted to respectively engage two pieces of work, each pair of stations also having a work receiving and holding bridging member adapted to engage both pieces of work, and transfer means for advancing the pieces of work to the successive stations.

5. In a machine of the character described, a plurality of pairs of stations successively arranged in a common plane and one behind the other, each pair of stations having current conducting means comprising a positive electrode and a negative electrode, each pair of stations also having conducting means comprising a bridging member, one of said conducting means being stationary and arranged to support the pieces of work and the other of said means being movable into and out of engagement with the pieces of work, and means for progressing the pieces of work to the several stations.

6. In a machine of the character described, a plurality of pairs of fixed electrodes, the electrodes of each pair being adapted to respectively engage two pieces of work, means for moving the work pieces to the successive electrodes, a plurality of bridging members one for each pair of electrodes, and means for bringing the bridging members into engagement with the pieces of work while the latter are in engagement with said electrodes.

7. In a machine of the character described, a plurality of pairs of stationary electrodes successively arranged, one electrode of each pair being positive and the other negative, each of said electrodes being adapted to support a piece of work, means for moving the work pieces onto the successive electrodes, a plurality of bridging members one for each pair of electrodes and arranged to engage the pieces of work supported thereon, and means for moving said bridging members into and out of engagement with the pieces of work.

8. In a machine of the character described, a plurality of pairs of fixed electrodes having work supporting surfaces arranged in a common plane, said electrodes being arranged in pairs, the electrodes of each pair being respectively positive and negative, means for transferring the work pieces to the successive electrodes, a plurality of bridging members one for each pair of electrodes and movable in the direction of the length of the pieces of work and in said plane, and means for moving the bridging members into and out of engagement with the pieces of work while supported by said electrodes.

9. In a machine of the character described, a plurality of stationary electrodes arranged generally one behind the other and in pairs, a plurality of rests spaced laterally from and respectively aligned with said electrodes, each electrode and its associated rest constituting a station at which a piece of work is adapted to be supported, transfer means for moving the work pieces to the successive stations, a plurality of bridging members one for each pair of electrodes and movable towards and away from said rests, and means for moving said bridging members into and out of engagement with the work pieces.

10. In a machine of the character described, a plurality of pairs of stations successively arranged in a common plane one behind the other, each pair of stations having current conducting means comprising a positive electrode and a negative electrode, each pair of stations also having conducting means comprising a bridging member, one of said conducting means being stationary and arranged to support the pieces of work and the other of said means being movable into and out of engagement with the pieces of work, and a transfer mechanism comprising a pair of spaced parallel bars extending in the direction in which said stations are spaced apart and movable upwardly to lift the work pieces from the supporting means, then rearwardly to advance the same, then downwardly, and then to original position.

11. In a machine of the character described, a plurality of stationary electrodes arranged generally one behind the other and in pairs, a plurality of rests spaced laterally from and respectively aligned with said electrodes, each electrode and its associated rest constituting a station at which a work piece is adapted to be supported, a plurality of bridging members one for each pair of electrodes and movable towards and away from said rests, means for moving said bridging members into and out of engagement with the work pieces, a transfer mechanism arranged to pick up the pieces of work, move them to successive stations, then out of engagement with the work and back to original position, and means for operating said transfer mechanism in timed relation to said bridging members.

12. In a machine of the character described, a plurality of stations associated in pairs, each pair of stations having a positive electrode and a negative electrode adapted to respectively engage two pieces of work, each pair of stations having a bridging member adapted to engage both pieces of work, a holder in which said bridging member is pivoted between its ends, means for reciprocating said holder, and transfer means for advancing the work pieces to the successive stations.

13. In a machine of the character described, a plurality of pairs of fixed electrodes, the electrodes of each pair being adapted to respectively engage two pieces of work, means for moving the work pieces to successive electrodes, a plurality of bridging members one for each pair of electrodes, a reciprocating holder for each bridging member, means for pivotally connecting each bridging member in its holder, and mechanism for moving said holders and including resilient means whereby said bridging members are yieldingly held against the pieces of work.

14. In a machine of the character described, a plurality of stationary electrodes arranged generally one behind the other and in pairs, a plurality of rests spaced laterally from and respectively aligned with said electrodes, said rests having stop surfaces against which the ends of the work pieces are adapted to engage, each electrode and its associated rest constituting a station at which a piece of work is adapted to be supported, transfer means for moving the work pieces to the successive stations, a plurality of bridging members one for each pair of electrodes and movable towards and away from said rests, and means for moving said bridging members towards and away from the work pieces and including a resilient connection.

15. In a machine of the character described, a plurality of fixed electrodes arranged in a horizontal plane one behind the other and in pairs, a plurality of rests spaced laterally from and respectively aligned with said electrodes, said rests being mounted for adjustment relative to the respective electrodes, each electrode and its associated rest constituting a station at which a piece of work is adapted to be supported with one end overhanging the electrode, transfer means for moving the work pieces to the successive stations, a plurality of bridging members one for each pair of electrodes and movable in the direction of the length of the work pieces into and out of engagement with the ends thereof, adjustable holders in which said bridging members are pivoted, and means for reciprocating said holders in timed relation to said transfer means.

16. In a machine of the character described, a plurality of pairs of stations successively arranged in a common plane and one behind the other, each pair of stations having current conducting means comprising a positive electrode and a negative electrode, each pair of stations also having conducting means comprising a bridging member, one of said conducting means being stationary and arranged to support the pieces of work and the other of said means being movable into and out of engagement with the pieces of work, means for progressing the pieces of work to the several stations, and clamping members movable in a plane at right angles to the plane of movement of said movable conducting means and adapted to hold the work against said stationary conducting means.

17. In a machine of the character described, a plurality of stations associated in pairs, each pair of stations having a positive electrode and a negative electrode adapted to respectively engage two pieces of work, each pair of stations also having a bridging member adapted to engage both pieces of work thereat, means for clamping the pieces of work against the electrodes, means for operating said bridging members, and transfer means for advancing the pieces of work to the successive stations.

18. In a machine of the character described, a plurality of pairs of stationary electrodes successively arranged one behind the other, means for moving the work pieces onto the successive electrodes, a plurality of bridging members one for each pair of electrodes and arranged to engage the pieces of work supported thereon, clamping members adapted to hold the work pieces against said electrodes and movable into and out of engagement with the work pieces in a plane at right angles to the plane of movement of said bridging members, and means for operating said bridging members and clamping means.

19. In a machine of the character described, a plurality of electrodes having work engaging surfaces arranged in a common plane one behind the other, said electrodes being arranged in pairs, means for transferring the work pieces to the successive electrodes, a plurality of bridging members movable in said common plane into and out of engagement with the work pieces, clamping members movable towards and away from said electrodes and in a plane at right angles to said common plane, and means for moving said transfer means, clamping members and bridging members in timed relation.

20. In a machine of the character described, a plurality of fixed electrodes having work engaging surfaces arranged in a horizontal plane and one behind the other, said electrodes being arranged in pairs, transfer means for moving the work pieces to the successive electrodes, a plurality of bridging members one for each pair of electrodes and movable in said plane into and out of engagement with the work pieces, a plurality of holders respectively associated with said pairs of electrodes and movable towards and away from said electrodes in a plane at right angles to said common plane, a block pivoted in each of said holders, a pair of clamping jaws on each block adapted to respectively engage the pieces of work, and means for moving said transfer means, clamping means and bridging members in timed relation.

21. In a machine of the character described, a plurality of electrodes having work engaging surfaces arranged in a common plane one behind the other, said electrodes being arranged in pairs, means for transferring the work pieces to the successive electrodes, a plurality of bridging members movable in said plane into and out of engagement with the work pieces, clamping members movable towards and away from said electrodes, a drive shaft, cam means on said drive shaft for operating said transfer means, and a cam on said drive shaft for moving said clamping members and bridging members.

22. In a machine of the character described, a plurality of pairs of stationary electrodes successively arranged, means for moving the work pieces onto the successive electrodes, bridging members one for each pair of electrodes, adjustable holders for said bridging members, clamping members for holding the work pieces against the electrodes, holders for said clamping members movable in a plane at right angles to the plane of movement of said first mentioned holders, driving means for reciprocating both sets of holders, resilient connections between said driving means and the first mentioned holders, and adjustable resilient connections between said driving means and the second mentioned holders.

23. In a machine of the character described, a plurality of stations having electrodes with which the work pieces are adapted to be successively brought into engagement, transfer means for advancing the work pieces in a series of steps to the successive stations, means for supplying a heating current to the electrodes, and automatic means driven in timed relation to said transfer means for controlling the heating current, said automatic means being manually adjustable during the operation of the machine.

24. In a machine of the character described, a plurality of pairs of electrodes successively arranged, means for advancing the work pieces in a series of steps to the successive electrodes, means for supplying a heating current to the electrodes, means for controlling the strength of the heating current, and automatic means for making and breaking the current, said automatic means being adjustable to vary the length of the heating periods.

25. In a machine of the character described, a plurality of stations having electrodes with which the work pieces are adapted to be successively brought into engagement, transfer mechanism for advancing the work pieces in a series of steps to the successive stations, means for supplying a heating current to the electrodes, adjustable and automatic means for making and breaking the current, and means for varying the speed of operation of said transfer means and current making and breaking means.

26. In a machine of the character described, a plurality of pairs of electrodes successively arranged, means for transferring the work pieces to the successive electrodes, a plurality of bridging members one for each pair of electrodes, clamping members movable towards and away from said electrodes, a transformer connected to said electrodes and having means for controlling the strength of the current supplied to the electrodes, a switch for making and breaking the current, a drive shaft having means for varying the speed thereof, cam means on said drive shaft for operating said transfer means, a cam on said drive shaft for moving said clamping members and bridging members, and adjustable cam means on said shaft for controlling said switch.

27. In a heating apparatus, a plurality of pairs of current applying contactors, each pair being adapted to engage and bring current to a work blank, said pairs of contactors being arranged along a common path, means for supporting and holding the work to the contactors by pressure, step by step feeding means for bringing the blanks one at a time to a pair of contactors, means for actuating said feeding and transfer means and said pressure means, a common driving means, and timing devices actuated thereby to govern the relative time desired for the heat application period and intermediate saturation period.

28. In a heating apparatus, a plurality of pairs of current applying contactors, each pair bring adapted to engage a work blank, said pairs of contactors being arranged along a common path, current conducting means leading to the contactors, means for supporting and holding the work to the contactors by pressure, step by step feeding means for presenting the blanks one at a time to successive pairs of contactors, means for actuating said feeding means and said pressure means, and driving means including timing devices to govern the relative time for the heat application period and intermediate transfer period.

29. In an electric heater for metal objects a plurality of sets of heating electrodes spaced apart, means for bringing work blanks to be heated into successive contact with the electrodes, means for supplying heating current to the electrodes, and means governing the line of said supply so that each work blank is subjected to heating current at the different stations in successive stages for predetermined times, whereby an intermediate heat saturation or distribution period is provided.

30. In an electric heater for metal objects, a plurality of pairs of heating electrodes arranged along a pathway, means for moving work blanks to be heated in a step by step progression along said pathway and for presenting them to the electrodes, means for causing the electrodes to engage the work blanks, means for supplying heating current to the electrodes intermittently whereby said work blanks are heated in successive stages by successive increments of heating current, and means for varying the heating current supplied to said electrodes.

31. In an electric heating apparatus, the combination of a pair of heating electrodes adapted to engage a work blank, one on the side of the blank and the other on the end thereof, spring actuating means for causing pressure contact at both the side and end, feeding mechanism for bringing the work blanks successively to said contactors and removing them therefrom, and a cam actuated mechanism for operating the pressure means, means supplying successive increments of heating current to said contactors, and a controlling means therefor governed by said cam mechanism and operatively connected with the pressure actuating means.

32. In an electric heating apparatus the combination with a suitable heating current supplying means, contactor elements connected therewith and adapted to engage a work blank to be heated, pressure plungers for urging the work blanks to the contactor surfaces, a common slide for said pressure plungers, driving mechanism including adjustable means to determine the amount of pressure at the time of application, and a timing mechanism controlling the current application adjustable in predetermined relation therewith.

PENROSE R. HOOPES.